US010119009B2

(12) United States Patent
Wehrmann et al.

(10) Patent No.: US 10,119,009 B2
(45) Date of Patent: Nov. 6, 2018

(54) FLOWABILITY OF POLYCARBONATE COMPOSITIONS

(71) Applicant: Covestro Deutschland AG, Leverkusen (DE)

(72) Inventors: Rolf Wehrmann, Krefeld (DE); Helmut Werner Heuer, Leverkusen (DE); Anke Boumans, Goch (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/532,207

(22) PCT Filed: Nov. 26, 2015

(86) PCT No.: PCT/EP2015/077728
§ 371 (c)(1),
(2) Date: Jun. 1, 2017

(87) PCT Pub. No.: WO2016/087295
PCT Pub. Date: Jun. 9, 2016

(65) Prior Publication Data
US 2017/0362410 A1  Dec. 21, 2017

(30) Foreign Application Priority Data
Dec. 1, 2014 (EP) .................................. 14195705

(51) Int. Cl.
*C08L 69/00* (2006.01)
*C08K 5/103* (2006.01)
*C08K 5/521* (2006.01)

(52) U.S. Cl.
CPC .............. *C08K 5/103* (2013.01); *C08K 5/521* (2013.01); *C08L 69/00* (2013.01)

(58) Field of Classification Search
CPC .......... C08K 5/103; C08K 5/521; C08K 5/51; C08K 5/52; C08L 69/00
See application file for complete search history.

(56) References Cited

U.S. PATENT DOCUMENTS

| | | | |
|---|---|---|---|
| 2,991,273 A | 7/1961 | Hechelhammer et al. | |
| 2,999,825 A | 9/1961 | Floyd et al. | |
| 2,999,846 A | 9/1961 | Schnell et al. | |
| 3,028,365 A | 4/1962 | Schnell et al. | |
| 3,148,172 A | 9/1964 | Fox | |
| 3,271,367 A | 9/1966 | Schnell et al. | |
| 3,879,348 A | 4/1975 | Serini et al. | |
| 4,521,562 A | 6/1985 | Rosenquist | |
| 4,743,641 A | 5/1988 | Shizawa et al. | |
| 4,982,014 A | 1/1991 | Freitag et al. | |
| 5,288,778 A | 2/1994 | Schmitter et al. | |
| 5,821,380 A | 10/1998 | Holderbaum et al. | |
| 5,883,165 A | 3/1999 | Kröhnke et al. | |
| 9,676,716 B2 | 6/2017 | Heuer et al. | |
| 2002/0049268 A1 | 4/2002 | White et al. | |
| 2011/0105659 A1* | 5/2011 | Konrad | C08K 5/10 524/147 |
| 2013/0123423 A1 | 5/2013 | Köhler et al. | |

FOREIGN PATENT DOCUMENTS

| | | |
|---|---|---|
| DE | 1570703 A1 | 2/1970 |
| DE | 2036052 A1 | 1/1972 |
| DE | 2 063 050 A1 | 7/1972 |
| DE | 2211956 A1 | 10/1973 |
| DE | 3832396 A1 | 2/1990 |
| DE | 102010014726 A1 | 10/2011 |
| EP | 0500496 A1 | 8/1992 |
| EP | 0839623 A1 | 5/1998 |
| EP | 0994155 A2 | 4/2000 |
| EP | 2338880 A2 | 6/2011 |
| FR | 1561518 A | 3/1969 |
| GB | 1122003 A | 7/1968 |
| GB | 1229482 A | 4/1971 |
| GB | 1367790 A | 9/1974 |
| JP | S61062039 A | 3/1986 |
| JP | S61062040 A | 3/1986 |
| JP | S61105550 A | 5/1986 |
| JP | S62181355 A | 8/1987 |
| JP | 2009292962 A | 12/2009 |
| JP | 2010150457 A | 7/2010 |
| JP | 2010150458 A | 7/2010 |
| JP | 2011108435 A | 6/2011 |
| JP | 2011256359 A * | 12/2011 |
| WO | WO-9615102 A2 | 5/1996 |
| WO | WO-2012152309 A1 * | 11/2012 .............. C10L 1/191 |

OTHER PUBLICATIONS

English machine translation of JP2011-256359 dated Jun. 23, 2018. (Year: 2018).*
International Search Report for PCT/EP2015/077727 dated Mar. 1, 2016.
Written Opinion of the International Searching for PCT/EP2015/077727 dated Mar. 1, 2016.
International Search Report for PCT/EP2015/077728 dated Jan. 26, 2016.
Written Opinion of the International Searching Authority for PCT/EP2015/077728 dated Jan. 26, 2016.

* cited by examiner

*Primary Examiner* — Christopher M Rodd
(74) *Attorney, Agent, or Firm* — Drinker Biddle & Reath LLP

(57) ABSTRACT

The present invention relates to the use of diglycerol esters for enhancing the flowability of transparent polycarbonate compositions. Melt viscosities and melt volume flow rates are improved. In addition, the diglycerol esters also exert a positive effect on the optical properties by increasing the transmission of the compositions and reducing the yellowness index.

9 Claims, No Drawings

FLOWABILITY OF POLYCARBONATE COMPOSITIONS

CROSS-REFERENCE TO RELATED APPLICATIONS

This application is a national stage application (under 35 U.S.C. § 371) of PCT/EP2015/077728, filed Nov. 26, 2015, which claims benefit of European Application No. 14195705.0, filed Dec. 1, 2014, both of which are incorporated herein by reference in their entirety.

The present invention relates to improving the flowability of transparent polycarbonate compositions.

BACKGROUND OF THE INVENTION

In the context of the invention the term "polycarbonate compositions" is to be understood as meaning compositions comprising polycarbonate as the main component. The term "polycarbonate" is to be understood here as encompassing both homopolycarbonates and copolycarbonates. These polycarbonates may be linear or branched in the familiar manner. Mixtures of polycarbonates may also be used according to the invention.

Preferably, in the context of the invention "transparent" is to be understood as meaning that the polycarbonate compositions exhibit a transmission, determined to ISO 13468 for a thickness of 4 mm, of at least 86%, more preferably of at least 88% in the range from 400 nm to 800 nm.

Particularly in the case of thin-walled casings, for example for ultrabooks or smartbooks, a low melt viscosity is required in order that components having a uniform wall thickness may be realized.

Bisphenol A diphosphate (BDP) is customarily used for flow enhancement, namely in amounts of up to more than 10 wt % in order to achieve the desired effect. However, this markedly reduces heat resistance.

Diglycerol esters are employed as antistatics in transparent compositions as described in JP 2011108435 A, JP 2010150457 A and JP 2010150458 A for example. JP 2009292962 A describes specific embodiments where the ester has at least 20 carbon atoms. JP 2011256359 A describes diglycerol-ester-containing flame retardant, UV-stabilized antistatic compositions. However, some of the compositions described therein exhibit melt instabilities and polymer degradation on exposure to heat. EP 0994155 describes the addition of full esters of tetraglycerol to a polycarbonate composition.

BRIEF SUMMARY OF THE INVENTION

It is accordingly a particular object of the present invention to improve the flowability of transparent polycarbonate compositions while simultaneously achieving good melt stability.

It has now been found that, surprisingly, this object is achieved by the use of diglycerol esters. It is particularly surprising that the diglycerol esters are also suitable for stabilizing polycarbonate produced by the melt-transesterification process.

The polycarbonate compositions which have had diglycerol ester added to them exhibit good melt stabilities with improved rheological properties, namely a higher melt volume flow rate (MVR) determined to DIN EN ISO 1133 (at a test temperature of 300° C., mass 1.2 kg), an improved melt viscosity determined to ISO 11443, and improved optical properties measurable by a lower yellowness index (YI) determined to ASTM E 313 compared to equivalent compositions comprising the same components save for the diglycerol esters. These compositions further exhibit good heat resistance measurable by the Vicat softening temperature VST/B50 which is determined to ISO 306.

Also observed was improved transmission at a wavelength of 400 to 800 nm determined to ISO 13468 for a thickness of 4 mm.

The polycarbonate compositions preferably comprise 0.2 to 1.0 wt % and very particularly preferably 0.3 to 0.6 wt % of diglycerol ester.

Transparent polycarbonate compositions in which the addition of diglycerol esters brings about melt stabilization, which manifests in particular as a reduction in the melt viscosity over the entire shear range, preferably comprise A) 20.0 wt % to 99.0 wt % of aromatic polycarbonate,
B) 0.01 wt % to 3.0 wt %, particularly preferably 0.2 to 1.0 wt % and very particularly preferably 0.3 to 0.6 wt % of diglycerol ester
C) 0.0 wt % to 1.0 wt % of heat stabilizer
D) 0.0 wt % to 10.0 wt % of further additives.

The composition preferably comprises no further components, the components A) to D) summing to 100 wt %.

DETAILED DESCRIPTION OF THE INVENTION

It is particularly preferable when such polycarbonate compositions are composed of A) 20.0 wt % to 99.0 wt % of aromatic polycarbonate,
B) 0.01 wt % to 3.0 wt %, yet more preferably 0.2 to 1.0 wt %, very particularly preferably 0.3 bis 0.6 wt % of diglycerol ester and
C) optionally up to 1.0 wt % of heat stabilizer and
D) optionally up to 10.0 wt % of one or more further additives from the group of antioxidants, UV absorbers, IR absorbers, antistatics, optical brighteners, light-scattering agents, colorants from the group of organic pigments, inorganic pigments, carbon black and/or dyes and the inorganic fillers titanium dioxide, barium sulphate and/or additives for laser marking.

In this embodiment it is particularly preferred that D) represents optionally up to 10.0 wt % of one or more further additives from the group of antioxidants, UV absorbers, IR absorbers, antistatics, optical brighteners, colorants from the group of organic pigments and/or dyes and/or additives for laser marking.

It is very particularly preferable when after addition of the diglycerol ester and the phosphate the polycarbonate composition comprises the constituents:

A) 20.0 wt % to 99.0 wt %, particularly preferably 75.0 wt % to 99.0 wt % and very particularly preferably 95.0 his 99.0 wt % of aromatic polycarbonate,
B) 0.01 wt % to 3.0 wt % of diglycerol ester and
C) optionally up to 1.0 wt % of heat stabilizer and
D) optionally up to 10.0 wt % of one or more further additives from the group of antioxidants, UV absorbers, IR absorbers, antistatics, optical brighteners, light-scattering agents, colorants from the group of organic pigments, inorganic pigments, carbon black and/or dyes and the inorganic fillers titanium dioxide, barium sulphate and/or additives for laser marking and
D-2) 0.001 to 0.1 wt % of a phosphate,
wherein the components A) to D) (including D-2) sum to 100 wt %.

Moreover, it is preferred when after addition of the diglycerol ester and the triisooctyl phosphate the polycarbonate composition comprises the constituents:
A) 20.0 wt % to 99.0 wt %, particularly preferably 75.0 wt % to 99.0 wt % and very particularly preferably 95.0 bis 99.0 wt % of aromatic polycarbonate,
B) 0.01 wt % to 3.0 wt % of diglycerol ester and
C) optionally up to 1.0 wt % of heat stabilizer and
D) optionally up to 10.0 wt % of one or more further additives from the group of antioxidants, UV absorbers, IR absorbers, antistatics, optical brighteners, light-scattering agents, colorants from the group of organic pigments, inorganic pigments, carbon black and/or dyes and the inorganic fillers titanium dioxide, barium sulphate and/or additives for laser marking and
D-2) 0.001 to 0.1 wt % of the triisooctyl phosphate,
wherein the components A) to D) (including D-2) sum to 100 wt %.

The diglycerol ester component in this case is preferably diglycerol monolaurate. Moreover, it is preferred that D) represents optionally up to 10.0 wt % of one or more further additives from the group of antioxidants, UV absorbers, IR absorbers, antistatics, optical brighteners, colorants from the group of organic pigments and/or dyes and/or additives for laser marking.

The compositions in which the flowability is improved in the manner according to the invention are preferably used for producing moldings. The compositions preferably have a melt volume flow rate (MVR) of from 3 to 60 $cm^3$/10 min and more preferably from 6 to 50 $cm^3$/10 min determined to ISO 1133 (test temperature 300° C., mass 1.2 kg) and a Charpy impact resistance greater than 60 $kJ/m^2$ determined to DIN EN ISO 179 at room temperature.

The use of the diglycerol esters in transparent polycarbonate compositions also provides an improvement in optical properties. The addition of the diglycerol esters increases the transmission determined to ISO 13468 for a thickness of 4 mm while simultaneously lowering the yellowness index Y.I. determined to ASTM E 313 (observer: 10°/light type: D65, for a specimen of 4 mm in thickness). This effect is amplified by also adding a phosphate, preferably triisooctyl phosphate to the composition.

The individual constituents of the compositions according to the invention are more particularly elucidated hereinbelow:

Component A

The polycarbonates comprised in the compositions to which diglycerol ester is added to improve the flowability are produced in familiar fashion from diphenols, carboxylic acid derivatives, optionally chain terminators and branching agents.

Particulars pertaining to the production of polycarbonates are disclosed in many patent documents spanning approximately the last 40 years. Reference is made here, for example, to Schnell, "Chemistry and Physics of Polycarbonates", Polymer Reviews, Volume 9, Interscience Publishers, New York, London, Sydney 1964, to D, Freitag, U. Grigo, P. R. Müller, Nouvertné, BAYER AG, "Polycarbonates" in Encyclopedia of Polymer Science and Engineering, Volume 11, Second Edition, 1988, pages 648-718 and finally to U. Grigo, K. Kirchner and P. R. Müller "Polycarbonate" in Becker/Braun, Kunststoff-Handbuch Volume 3/1, Polycarbonate, Polyacetale, Polyester, Celluloseester, Carl Hanser Verlag Munich, Vienna 1992, pages 117-299.

Aromatic polycarbonates are produced, for example, by reacting diphenols with carbonic halides, preferably phosgene, and/or with aromatic dicarbonyl dihalides, preferably benzenedicarbonyl dihalides, by the interfacial process, optionally using chain terminators and optionally using trifunctional or more than trifunctional branching agents. Production via a melt polymerization process by reaction of diphenols with, for example, diphenyl carbonate is likewise possible.

Examples of diphenols suitable for the production of polycarbonates include hydroquinone, resorcinol, dihydroxydiphenyls, bis(hydroxyphenyl)alkanes, bis(hydroxyphenyl)cycloalkanes, bis(hydroxyphenyl) sulphides, bis(hydroxyphenyl) ethers, bis(hydroxyphenyl) ketones, bis(hydroxyphenyl) sulphones, bis(hydroxyphenyl) sulphoxides, bis(hydroxyphenyl)diisopropylbenzenes, phthalimidines derived from derivatives of isatin or phenolphthalein and the ring-alkylated, ring-arylated and ring-halogenated compounds thereof.

Preferred diphenols are 4,4'-dihydroxydiphenyl, 2,2-bis(4-hydroxyphenyl)propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl) propane, dimethylbisphenol A, bis(3,5-dimethyl-4-hydroxyphenyl)methane, 2,2-bis(3,5-dimethyl-4-hydroxyphenyl)propane, bis(3,5-dimethyl-4-hydroxyphenyl)sulphone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane.

Particularly preferred diphenols are 2,2-bis(4-hydroxyphenyl)propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane and dimethylbisphenol A.

These and further suitable diphenols are described, for example, in U.S. Pat. No. 3,028,635, U.S. Pat. No. 2,999,825, U.S. Pat. No. 3,148,172, U.S. Pat. No. 2,991,273, U.S. Pat. No. 3,271,367, U.S. Pat. No. 4,982,014 and U.S. Pat. No. 2,999,846, in DE-A 1 570 703, DE-A 2063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and also in JP-A 62039/1986, JP-A 62040/1986 and JP-A 105550/1986.

In the case of homopolycarbonates only one diphenol is employed and in the case of copolycarbonates two or more diphenols are employed.

Examples of suitable carboxylic acid derivatives include phosgene or diphenyl carbonate.

Suitable chain terminators that may be employed in the production of polycarbonates are monophenols. Examples of suitable monophenols include phenol itself, alkylphenols such as cresols, p-tert-butylphenol, cumylphenol and mixtures thereof.

Preferred chain terminators are phenols which are mono or polysubstituted with linear or branched, preferably unsubstituted $C_1$ to $C_{30}$ alkyl radicals or with tert-butyl. Particularly preferred chain terminators are phenol, cumylphenol and/or p-tert-butylphenol.

The amount of chain terminator to be employed is preferably 0.1 to 5 mol % based on the moles of diphenols employed in each case. The addition of the chain terminators may be carried out before, during or after the reaction with a carboxylic acid derivative.

Suitable branching agents are the trifunctional or more than trifunctional compounds familiar in polycarbonate chemistry, in particular those having three or more than three phenolic OH groups.

Examples of suitable branching agents include 1,3,5-tri (4-hydroxyphenyl)benzene, 1,1,1-tri(4-hydroxyphenyl)ethane, tri(4-hydroxyphenyl)phenylmethane, 2,4-bis(4-hydroxyphenylisopropyl)phenol, 2,6-bis(2-hydroxy-5'-methylbenzyl)-4-triethylphenol, 2-(4-hydroxyphenyl)-2-(2, 4-dihydroxyphenyl)propane, tetra(4-hydroxyphenyl) methane, tetra(4-(4-hydroxyphenylisopropyl)phenoxy) methane and 1,4-bis((4',4"-dihydroxytriphenyl)methyl) benzene and 3,3-bis(3-methyl-4-hydroxyphenyl)-2-oxo-2,3-dihydroindole.

The amount of the branching agents that are optionally to be employed is preferably from 0.05 mol % to 2.00 mol % based on the moles of diphenols employed in each case.

The branching agents may either be initially charged with the diphenols and the chain terminators in the aqueous alkaline phase or added as a solution in an organic solvent prior to the phosgenation. In the case of the transesterification process the branching agents are employed together with the diphenols.

Particularly preferred polycarbonates are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

To facilitate incorporation of additives component A is preferably employed in the form of powders, pellets or mixtures of powders and pellets.

The polycarbonate employed may also be a mixture of different polycarbonates, for example of the polycarbonates A1 and A2.

The amount of the aromatic polycarbonate A1 based on the total amount of polycarbonate is from 25.0 to 85.0 wt %, preferably from 28.0 to 84.0 wt %, particularly preferably from 30.0 to 83.0 wt %, wherein this aromatic polycarbonate is based on bisphenol A and preferably has a melt volume flow rate MVR of 7 to 15 cm$^3$/10 min, more preferably has a melt volume flow rate MVR of 8 to 12 cm$^3$/10 min and particularly preferably has a melt volume flow rate MVR of 8 to 11 cm$^3$/10 min determined to ISO 1133 (test temperature 300° C., mass 1.2 kg).

The amount of the pulverulent aromatic polycarbonate A2 based on the total amount of polycarbonate is from 3.0 to 12.0 wt %, preferably from 4.0 to 11.0 wt %, particularly preferably from 3.0 to 10.0 wt %, wherein this aromatic polycarbonate is preferably based on bisphenol A and preferably has a melt volume how rate MVR of 3 to 8 cm$^3$/10 min, more preferably has a melt volume flow rate MVR of 4 to 7 cm$^3$/10 min and particularly preferably has a melt volume flow rate MVR of 6 cm$^3$/10 min determined to ISO 1133 (test temperature 300° C., mass 1.2 kg).

In a preferred embodiment, the polycarbonate according to the invention does not comprise monomer units selected from the group consisting of the structural units of general formulae

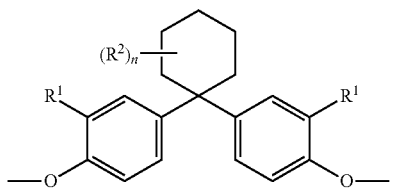

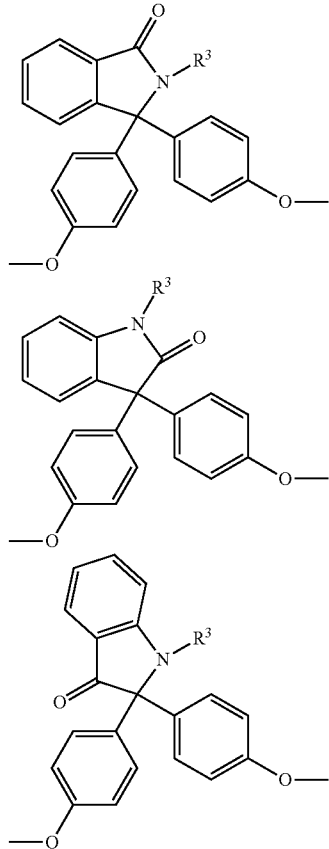

where
R$^1$ is hydrogen or C1-C4 alkyl,
R$^2$ is C1-C4 alkyl,
n is 0, 1, 2 or 3 and
R$^3$ is C1-C4 alkyl, aralkyl or aryl
or blends thereof.

Component B

The diglycerol esters employed as flow enhancers are esters of carboxylic acids and diglycerol. Esters based on various carboxylic acids are suitable here. The esters may also be based on different isomers of diglycerol. Diglycerol polyesters may be employed as well as monoesters. It is also possible to employ mixtures instead of pure compounds.

Isomers of diglycerol which form the basis for the diglycerol esters employed in accordance with the invention are:

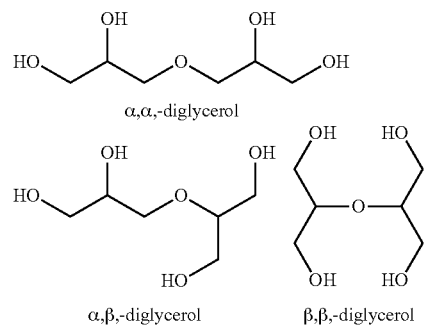

α,α,-diglycerol

α,β,-diglycerol    β,β,-diglycerol

The mono- or polysubstituted analogues of these isomers may be employed as the diglycerol esters used in accordance with the invention. Mixtures employable as flow auxiliaries are composed of the diglycerol reactants and the ester end products derived therefrom for example having molecular weights of 348 g/mol (monolaurate) or 530 g/mol (dilaurate).

The diglycerol esters comprised in the composition according to the invention preferably derive from saturated or unsaturated monocarboxylic acids having a chain length of from 6 to 30 carbon atoms. Examples of suitable monocarboxylic acids include caprylic acid ($C_7H_{15}COOH$, octanoic acid), capric acid ($C_9H_{19}COOH$, decanoic acid), lauric acid ($C_{11}H_{23}COOH$, dodecanoic acid), myristic acid ($C_{13}H_{27}COOH$, tetradecanoic acid), palmitic acid ($C_{15}H_{31}COOH$, hexadecanoic acid), margaric acid ($C_{16}H_{33}COOH$, heptadecaoic acid), stearic acid ($C_{17}H_{35}COOH$, octadecanoic acid), arachidic acid ($C_{19}H_{39}COOH$, eicosanoic acid), behenic acid ($C_{23}H_{43}COOH$, docosanoic acid), lignoceric acid ($C_{23}H_{47}COOH$, tetracosanoic acid), palmitoleic acid ($C_{15}H_{29}COOH$, (9Z)-hexadec-9-enoic acid), petroselinic acid ($C_{17}H_{33}COOH$, (6Z)-octadec-6-enoic acid), oleic acid ($C_{17}H_{33}COOH$, (9Z)-octadec-9-enoic acid), elaidic acid ($C_{17}H_{33}COOH$, (9E)-octadec-9-enoic acid), linoleic acid ($C_{17}H_{31}COOH$, (9Z,12Z)-octaleca-9,12-dienoic acid), alpha- or gamma-linolenic acid ($C_{17}H_{29}COOH$, (9Z,12Z,15Z)-octadeca-9,12,15-trienoic acid and (6Z,9Z,12Z)-octadeca-6,9,12-trienoic acid), arachidonic acid ($C_{19}H_{31}COOH$, (5Z,8Z,11Z,14Z)-eicosa-5,8,11,14-tetraenoic acid), timnodonic acid ($C_{19}H_{29}COOH$, (5Z,8Z,11Z,14Z,17Z)-eicosa-5,8,11,14,17-pentaenoic acid) and cervonic acid ($C_{21}H_{31}COOH$, (4Z,7Z,10Z,13Z,16Z,19Z)-docosa-4,7,10,13,16,19-hexaenoic acid). Particular preference is given to lauric acid, palmitic acid, stearic acid and/or oleic acid.

It is particularly preferable when at least one ester of formula (I) is present as the diglycerol ester constituent

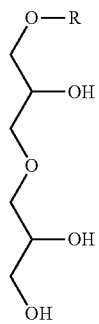

(I)

where R=$COC_nH_{2n+1}$ and/or R=COR',
wherein n is an integer and R' is a branched alkyl radical or a branched or unbranched alkenyl radical and $C_nH_{2n+1}$ is an aliphatic, saturated linear alkyl radical.

It is preferable when n is an integer of 6-24 and $C_nH_{2n+1}$ is therefore n-hexyl, n-heptyl, n-octyl, n-nonyl, n-decyl, n-dodecyl, n-tridecyl, n-tetradecyl, n-hexadecyl or n-octadecyl for example. It is more preferable when n=8 to 18, particularly preferably 10 to 16, very particularly preferably 12 (diglycerol monolaurate isomer which has a molecular weight of 348 g/mol and is particularly preferred as the main product in a mixture). In accordance with the invention the ester groups mentioned hereinabove are preferably also present in the other isomers of the diglycerol.

Accordingly, a mixture of different diglycerol esters may also be concerned.

Preferably employed diglycerol esters have an HLB value of at least 6, particularly preferably 6 to 12, wherein the term HLB value refers to the so-called "hydrophilic-lipophilic balance" which is calculated according to Griffin's method as follows:

$$HLB=20\times(1-M_{lipophilic}/M),$$

wherein $M_{lipophilic}$ is the molar mass of the lipophilic fraction of the diglycerol ester and M is the molar mass of the diglycerol ester.

The amount of diglycerol ester is 0.01 to 3.0 wt %, preferably 0.10 to 2.0 wt %, more preferably 0.15 to 1.50 wt % and particularly preferably 0.20 to 1.0 wt %, very particularly preferably 0.3 to 0.6 wt %.

Component C

Preferentially suitable heat stabilizers are triphenylphosphine, tris(2,4-di-tert-butylphenyl) phosphite (Irgafos® 168), tetrakis(2,4-di-tert-butylphenyl)[1,1-biphenyl]-4,4'-diyl bisphosphonic, octadecyl-3-(3,5-di-tert-butyl-4-hydroxyphenyl) propionate (Irganox® 1076), bis(2,4-dicumylphenyl)pentaerythritol diphosphite (Doverphos® S-9228), bis(2,6-di-tert-butyl-4-methylphenyl)pentaerythritol diphosphite (ADK STAB PEP-36). Said heat stabilizers are employed alone or as mixtures (for example Irganox® B900 (mixture of Irgafos® 168 and Irganox® 1076 in a 1:3 ratio) or Doverphos® 5-9228 with Irganox® B900/Irganox® 1076). The heat stabilizers are preferably employed in amounts of from 0.003 to 0.2 wt %.

Component D

Optionally also present are up to 10.0 wt %, preferably 0.10 to 8.0 wt %, particularly preferably 0.2 to 3.0 wt % of other customary additives ("further additives"). The group of further additives does not include heat stabilizers since these are described hereinabove as component C.

Such additives, as are customarily added to polycarbonates, are in particular the antioxidants, UV absorbers, IR absorbers, antistatics, optical brighteners, light-scattering agents, colorants such as organic pigments, including inorganic pigments, carbon black and/or dyes, inorganic fillers such as titanium dioxide, barium sulphate and/or additives for laser marking that are described in EP-A 0 839 623, WO-A 96/15102, EP-A 0 500 496 or "Plastics Additives Handbook", Hans Zweifel, 5th Edition 2000, Hanger Verlag, Munich in the amounts customary for polycarbonate. These additives may be added singly or else as mixtures. Preferably, such additives are antioxidants, UV absorbers, IR absorbers, antistatics, optical brighteners, colorants such as organic pigments and/or dyes and/or additives for laser marking in amounts customary for polycarbonate.

Preferred additives are specific UV stabilizers having a very low transmission below 400 nm and a very high transmission above 400 nm. Ultraviolet absorbers particularly suitable for use in the composition according to the invention are benzotriazoles, triazines, benzophenones and/or arylated cyanoacrylates.

Particularly suitable ultraviolet absorbers are hydroxybenzotriazoles, such as 2-(3',5'-bis(1,1-dimethylbenzyl)-2'-hydroxyphenyl)benzotriazole (Tinuvin® 234, BASF, Ludwigshafen), 2-(2'-hydroxy-5'-(tert-octyl)phenyl) benzotriazole (Tinuvin® 329, BASF, Ludwigshafen), bis(3-(2H-benzotriazolyl)-2-hydroxy-5-tert-octyl)methane (Tinuvin® 360, BASF, Ludwigshafen), 2-(4,6-diphenyl-1,3,5-triazin-2-yl)-5-(hexyloxy)phenol (Tinuvin® 1577, BASF, Ludwigshafen), and also benzophenones such as 2,4-trihydroxybenzophenone (Chimassorb® 22, BASF, Ludwigshafen) and 2-hydroxy-4-(octyloxy)benzophenone (Chimassorb® 81, BASF, Ludwigshafen), 2,2-bis[[(2-cyano-1-oxo-3,3-diphenyl-2-propenyl)oxy]methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (Tinuvin® 1600, BASF, Ludwigshafen), tetraethyl-2,2'-(1,4-phenylenedimethylidene) bismalonate (Hostavin® B-Cap, Clariant AG) or N-(2-ethoxyphenyl)-N'-(2-ethylphenyl)ethanediamide (Tintivin® 312, CAS No. 23949-66-8, BASF, Ludwigshafen).

Particularly preferred specific UV stabilizers are Tinuvin® 360, Tinuvin® 329 and/or Tinuvin® 312, very particular preference being given to Tinuvin® 329 and Tinuvin® 312.

It is also possible to employ mixtures of these ultraviolet absorbers.

It is preferable when the composition comprises ultraviolet absorbers in an amount of up to 0.8 wt %, preferably 0.05 wt % to 0.5 wt % and more preferably 0.1 wt % to 0.4 wt %, based on the total composition.

The compositions according to the invention may also comprise phosphates or sulphonate esters as transesterification stabilizers. Preferably, at least one phosphate is contained. Preferably, this phosphate is an organic phosphate. Said compositions more preferably comprise triisooctyl phosphate as stabilizer. It has been found that, surprisingly, using a combination of at least one diglycerol ester with at least one phosphate, preferably triisooctyl phosphate makes it possible to obtain polycarbonate compositions exhibiting not only the improved flowability but also improved optical properties. In particular, this makes it possible to obtain compositions exhibiting increased transmission, lower haze and a lower Y.I.

Using the combination in particular improves these optical properties compared to use of the individual components (synergistic effect).

The phosphate, preferably triisooctyl phosphate is preferably employed in amounts of 0.001 to 0.1, particularly preferably 0.002 to 0.08 and very particularly preferably 0.005 to 0.05 wt % based on the total composition.

In accordance with the invention the phosphate, preferably triisooctyl phosphate is treated as belonging to component D) (normally referred to as D-2). However, said component is preferably not optional. All descriptions referring to component D), which are optional, in this case relate to all other components referred to as D) save for the phosphate, preferably triisooctyl phosphate which is essential.

The composition is preferably free of mould release agents, for example GMS. The glycerol ester itself acts as a mould release agent.

It is particularly preferable when the compositions comprise at least one heat stabilizer (component C) and optionally, as a further additive (component D), transesterifications stabilizer, in particular a phosphate, preferably triisooctyl phosphate, or a UV absorber.

The polycarbonate compositions comprising the components A to D are produced by commonplace methods of incorporation by combining, mixing and homogenizing the individual constituents, the homogenization in particular preferably being carried out in the melt by application of shear forces. The combining and mixing is optionally performed prior to melt homogenization by use of pulverulent pre-mixes.

It is also possible to employ pre-mixes of pellets or pellets and powders with the components B to D.

Also usable are pre-mixes formed from solutions of the mixing components in suitable solvents, in which case it is optionally possible to homogenize in solution and to remove the solvent thereafter.

In particular, components B to D of the composition according to the present invention are incorporable in the polycarbonate by familiar methods or as a masterbatch.

The use of masterbatches to incorporate the components B to D—singly or as mixtures—is preferable.

In this context, the composition according to the present invention can be mixed, homogenized and subsequently extruded in customary apparatuses such as screw extruders (ZSK twin-screw extruders for example), kneaders or Brabender or Banbury mills. After extrusion, the extrudate may be chilled and comminuted. It is also possible to pre-mix individual components and then to add the remaining starting materials singly and/or likewise mixed.

The combining and commixing of a pre-mix in the melt may also be effected in the plasticizing unit of all injection moulding machine. In this case, the melt is directly converted into a moulded article in a subsequent step.

The plastics material mouldings are preferably produced by injection moulding.

The polycarbonate compositions are suitable for producing multilayer systems. This comprises applying the polycarbonate composition to one or more layers atop a moulded article made of a plastics material. Application may be carried out at the same time as or immediately after the moulding of the moulded article, for example by foil insert moulding, coextrusion or multicomponent injection moulding. However, application may also be to the ready-moulded main body, for example by lamination with a film, by encapsulative overmoulding of an existing moulded article or by coating from a solution.

The polycarbonate compositions comprising added diglycerol ester for flow enhancement are suitable for producing components in the automotive sector, for instance for bezels, headlight covers or frames, lenses and collimators or light guides and for producing frame components in the electrical/electronic (EE) and IT sectors, in particular for applications subject to stringent flowability requirements (thin layer applications). Such applications include, for example, screens or housings, for instance for ultrabooks or frames for LED display technologies, e.g. OLED displays or LCD displays or else for E-ink devices. Further applications are housing parts of mobile communication terminals, such as smartphones, tablets, ultrabooks, notebooks or laptops, but also satnavs, smartwatches or heart rate meters, and also electrical applications in thin-walled designs, for example home and industrial networking systems and smart meter housing components.

EXAMPLES

1. Description of Raw Materials and Test Methods

The polycarbonate compositions described in the following examples were produced on a Berstorff ZE 25 extruder at a throughput of 10 kg/h by compounding. The melt temperature was 275° C.

Component A-1: linear polycarbonate based on bisphenol A, having a melt volume flow rate MVR of 12.5 cm$^3$/10 min (to ISO 1133 at a test temperature of 300° C. and 1.2 kg loading) and comprising 250 ppm of triphenylphosphine as component C (heat stabilizer), produced by addition via a side-arm extruder.

Component A-2: pulverulent linear polycarbonate based on bisphenol A and having a melt volume flow rate MVR of 6 cm³/10 mm (to ISO 1133 at a test temperature of 300° C. and 1.2 kg loading).

Component A-3: UV-protected BPA polycarbonate (Makrolon® AL 2447) from Bayer MaterialScience having a melt volume flow rate MVR of 18 cm³/10 min (to ISO 1133 at a test temperature of 300° C. and 1.2 kg loading).

The yellowness index (Y.I.) was determined to ASTM E 313 (observer: 10°/light type: D65) for specimens having a sheet thickness of 4 mm.

Transmission in the VIS range of the spectrum (400 nm to 800 nm) was determined to ISO 13468 for a sheet thickness of 4 mm.

Haze was determined to ASTM D1003 for a sheet thickness of 4 mm.

2. Compositions

TABLE 1

Comparative examples 1V to 7V

|  |  | 1V | 2V | 3V | 4V | 5V | 6V | 7V |
|---|---|---|---|---|---|---|---|---|
| A-1 | wt % | 93 | 93 | 93 | 93 | 93 | 93 | 93 |
| A-2 | wt % | 7 | 6.9 | 6.8 | 6.6 | 6.9 | 6.8 | 6.6 |
| D-1 | wt % | — | 0.1 | 0.2 | 0.4 | — | — | — |
| B | wt % | — | — | — | — | 0.1 | 0.2 | 0.4 |
| pellet eta rel |  | 1.280 |  |  |  | 1.281 | 1.280 |  |
| test specimen eta rel |  | 1.278 |  |  |  | 1.277 | 1.276 |  |
| MVR 7'/300° C./1.2 kg | ml/10 min | 12.2 | 12.4 | 12.6 | 13.0 | 14.5 | 21.5 | 26.5 |
| MVR 20'/300° C./1.2 kg | ml/10 min | 12.2 | 12.3 | 12.4 | 13.1 | 15.9 | 22.0 | 28.8 |
| Δ MVR 20'/MVR 7' |  | 0.0 | −0.1 | −0.2 | 0.1 | 1.4 | 0.5 | 2.3 |
| Vicat VSTB 50 | ° C. | 146.6 | 146.1 | 144.8 | 143.6 | 145.3 | 144.7 | 143.5 |
| coefficient of friction Rz 1.5 |  |  |  |  |  |  |  |  |
| sliding friction |  | 0.52 | 0.39 | 0.33 | 0.29 | 0.39 | 0.34 | 0.32 |
| static friction |  | 0.58 | 0.42 | 0.39 | 0.35 | 0.36 | 0.39 | 0.39 |
| notched impact strength ISO 7391/180A (3 mm) |  |  |  |  |  |  |  |  |
| at 23° C. | kJ/m² | 63 tough | 64 tough | 63 tough | 64 tough | 64 tough | 65 tough | 64 tough |
| at 0° C. | kJ/m² | 58 tough | 57 tough | 58 tough | 58 tough | — | 58 tough | 57 tough |
| optics 4 mm |  |  |  |  |  |  |  |  |
| transmission | % | 87.61 | 88.76 | 88.92 | 89.05 | 89.07 | 89.11 | 89.12 |
| haze | % | 1.09 | 0.62 | 0.61 | 0.53 | 0.56 | 0.52 | 0.55 |
| Y.I. |  | 2.47 | 2.17 | 2.21 | 2.13 | 2.11 | 2.14 | 2.21 |

Component A-4: melt BPA polycarbonate (Makrolon® AL 2600) from Bayer MaterialScience having a melt volume flow rate MVR of 12 cm³/10 min (to ISO 1133 at a test temperature of 300° C. and 1.2 kg loading).

Component B: Poem DL-100 (diglycerol monolaurate) from Riken Vitamin as flow auxiliary.

Component C: triphenylphosphine (TPP) from BASF SE as heat stabilizer.

Component D-1: pentaerythritol tetrastearate (PETS) from Emery oleochemicals.

Component D-2: triisooctyl phosphate (TOF) from Lanxess AG as transesterification stabilizer.

The Charpy notched impact strength was measured to ISO 7391/180A at room temperature on single side gate injection moulded test bars measuring 80×10×3 mm.

As a measure for the heat distortion resistance the Vicat softening temperature VST/B50 was determined to ISO 306 on 80×10×4 mm test specimens with a needle load of 50 N and a heating rate of 50° C./h using a Coesfeld Eco 2920 instrument from Coesfeld Materialtest.

The melt volume flow rate (MVR) was determined to ISO 1133 (at a test temperature of 300° C., mass 1.2 kg) using a Zwick 4106 instrument from Zwick Roell.

The melt viscosities were determined to ISO 11443 (cone-plate arrangement).

Important properties of the compositions 5V, 6V and 7V are reported in table 1. These are contrasted with the comparative examples 1V to 4V. It is apparent from the table that the compositions of the comparative examples which contain no diglycerol ester-pure polycarbonate or polycarbonate comprising PETS—exhibit markedly poorer melt volume flow rates MVR.

Surprisingly, the compositions 5V to 7V exhibit not only a significant improvement in the melt volume flow rate but also an increase in transmission and a reduced yellowness index YI.

TABLE 2

Inventive compositions comprising triisooctyl phosphate

| Formulation: |  | 8 | 9 | 10 |
|---|---|---|---|---|
| A-1 | wt % | 93 | 93 | 93 |
| A-2 | wt % | 6.79 | 6.59 | 6.39 |
| B | wt % | 0.2 | 0.4 | 0.6 |
| D-2 | wt % | 0.01 | 0.01 | 0.01 |
| Pellet $\eta_{rel}$ |  | 1.279 | 1.278 | 1.277 |
| test specimen $\eta_{rel}$ |  | 1.277 | 1.274 | 1.273 |
| MVR 7'/300° C./1.2 kg | ml/10 min | 20.8 | 29.5 | 52.6 |
| MVR 20'/300° C./1.2 kg | ml/10 min | 23.1 | 31.1 | 53.4 |
| Δ MVR 20'/MRV7' |  | 2.3 | 1.6 | 0.8 |
| Vicat VSTB 50 | ° C. | 143.9 | 141.9 | 140.3 |
| notched impact strength |  |  |  |  |

TABLE 2-continued

Inventive compositions comprising triisooctyl phosphate

| Formulation: | | 8 | 9 | 10 |
|---|---|---|---|---|
| ISO 7391/180A (3 mm) | | | | |
| at RT | kJ/m² | 64 tough | 65 tough | 62 tough |
| at 0° C. | kJ/m² | 57 tough | 58 tough | 61 tough |
| optics 4 mm | | | | |
| transmission | % | 89.3 | 89.35 | 89.36 |
| haze | % | 0.44 | 0.39 | 0.38 |
| Y.I. | | 2.11 | 2.04 | 2.06 |

Important properties of the inventive compositions 8 to 10 are reported in table 2. Compared to examples 6V and 7V it is apparent that the melt volume flow rates MVR are increased further for the triisooctyl phosphate-containing examples.

Surprisingly, the inventive compositions exhibit not only a significant improvement in the melt volume flow rate but also a decrease in haze.

TABLE 3

Comparative examples 11V to 14V

| | | 11V | 12V | 13V | 14V |
|---|---|---|---|---|---|
| A-3 | wt % | 100 | 99.9 | 99.8 | 99.7 |
| B | wt % | | 0.1 | 0.2 | 0.3 |
| pallet eta rel | | 1.257 | 1.255 | 1.256 | 1.255 |
| MVR 300° C./ 1.2 kg | cm³/10 min | 18.1 | 23.5 | 29.7 | 38.5 |
| melt viscosity at 280° C. | | | | | |
| eta 50 | Pa · s | | 402 | | |
| eta 100 | Pa · s | 485 | 400 | 281 | 182 |
| eta 200 | Pa · s | 472 | 395 | 277 | 175 |
| eta 500 | Pa · s | 415 | 354 | 253 | 170 |
| eta 1000 | Pa · s | 339 | 296 | 230 | 152 |
| eta 1500 | Pa · s | 285 | 252 | 212 | 136 |
| eta 5000 | Pa · s | 137 | 127 | 113 | 83 |
| melt viscosity at 300° C. | | | | | |
| eta 50 | Pa · s | — | — | — | — |
| eta 100 | Pa · s | — | — | — | — |
| eta 200 | Pa · s | 235 | 151 | 146 | 126 |
| eta 500 | Pa · s | 218 | 145 | 132 | 126 |
| eta 1000 | Pa · s | 195 | 137 | 126 | 118 |
| eta 1500 | Pa · s | 174 | 131 | 118 | 107 |
| eta 5000 | Pa · s | 95 | 82 | 76 | 72 |

TABLE 4

Inventive compositions and comparative example 15V

| Formulation | | 15V | 16 | 17 |
|---|---|---|---|---|
| A-4 | wt % | 100 | 99.8 | 99.6 |
| B | wt % | | 0.2 | 0.4 |
| D-2)* | ppm | 100 | 100 | 100 |
| pellet eta rel | | 1.272 | 1.270 | 1.269 |
| melt viscosity at 280° C. | | | | |
| eta 50 | Pa · s | 631 | 535 | 440 |
| eta 100 | Pa · s | 608 | 525 | 423 |
| eta 200 | Pa · s | 570 | 497 | 401 |
| eta 500 | Pa · s | 475 | 425 | 331 |
| eta 1000 | Pa · s | 370 | 308 | 242 |

TABLE 4-continued

Inventive compositions and comparative example 15V

| Formulation | | 15V | 16 | 17 |
|---|---|---|---|---|
| eta 1500 | Pa · s | 305 | 251 | 185 |
| eta 5000 | Pa · s | 143 | 120 | 85 |
| melt viscosity at 300° C. | | | | |
| eta 50 | Pa · s | 350 | 214 | 136 |
| eta 100 | Pa · s | 347 | 211 | 134 |
| eta 200 | Pa · s | 336 | 199 | 131 |
| eta 500 | Pa · s | 297 | 182 | 125 |
| eta 1000 | Pa · s | 250 | 161 | 115 |
| eta 1500 | Pa · s | 217 | 141 | 107 |
| eta 5000 | Pa · s | 115 | 85 | 70 |
| melt viscosity at 320° C. | | | | |
| eta 50 | Pa · s | 198 | 111 | 77 |
| eta 100 | Pa · s | 195 | 110 | 76 |
| eta 200 | Pa · s | 189 | 108 | 74 |
| eta 500 | Pa · s | 177 | 106 | 71 |
| eta 1000 | Pa · s | 158 | 99 | 67 |
| eta 1500 | Pa · s | 142 | 92 | 63 |
| eta 5000 | Pa · s | 85 | 61 | 50 |
| Vicat VSTB50 | ° C. | 143.8 | 143.3 | 142.2 |

*the indicated wt.-% auf A-4 and B relate to the total amount of A-4 and B. D-2) is additionally added.

Surprisingly, the compositions which have had diglycerol ester added to them in accordance with the invention exhibit a markedly improved melt viscosity determined at different shear rates.

The invention claimed is:

1. A method comprising enhancing the flowability of a transparent polycarbonate composition comprising utilizing at least one diglycerol ester in combination with at least one phosphate, wherein the transparent polycarbonate composition exhibits a transmission, determined to ISO 13468 for a thickness of 4 mm, of at least 88% in the range from 400 nm to 800 nm.

2. The method according to claim 1, wherein the diglycerol ester is an ester of formula (I)

where R=COC$_n$H$_{2n+1}$ and/or R=COR',
wherein n is an integer and R' is a branched alkyl radical or a branched or unbranched alkenyl radical and C$_n$H$_{2n+1}$ is an aliphatic, saturated linear alkyl radical.

3. The method according to claim 2, wherein R=COC$_n$H$_{2n+1}$, wherein n is an integer of 6-24.

4. The method according to claim 1, wherein after addition of the diglycerol ester and the phosphate the polycarbonate composition comprises A) 20.0 wt % to 99.0 wt % of aromatic polycarbonate,
B) 0.01 wt % to 3.0 wt % of diglycerol ester and
C) 0.0 wt % to 1.0 wt % of heat stabilizer.

5. The method according to claim 1, wherein after addition of the diglycerol ester and the phosphate the polycarbonate composition comprises the constituents:
A) 20.0 wt % to 99.0 wt % of aromatic polycarbonate,
B) 0.01 wt % to 3.0 wt % of diglycerol ester and
C) optionally up to 1.0 wt % of heat stabilizer and
D) optionally up to 10.0 wt % of one or more further additives from the group of antioxidants, UV absorbers, IR absorbers, antistatics, optical brighteners, light-scattering agents, colorants from the group of organic pigments, inorganic pigments, carbon black and/or dyes and the inorganic fillers titanium dioxide, barium sulphate and/or additives for laser marking and
D-2) 0.001 to 0.1 wt % of phosphate,
wherein the components A) to E), including D-2), sum to 100 wt %.

6. The method according to claim 4, wherein the amount of the diglycerol ester is from 0.2 to 1.0 wt %.

7. The method according to claim 4, wherein the amount of the diglycerol ester is from 0.3 to 0.6 wt %.

8. The method according to claim 1, wherein the melt viscosity of the polycarbonate compositions determined to ISO 11443 is reduced by the diglycerol ester.

9. The method according to claim 1, wherein the at least one phosphate is triisooctyl phosphate.

* * * * *